(12) United States Patent
Harrington et al.

(10) Patent No.: US 8,619,765 B2
(45) Date of Patent: Dec. 31, 2013

(54) AUTOMATIC RECONFIGURATION OF LAYER 3 DEVICE TO LAYER 2 DEVICE UPON DETECTION OF UPSTREAM NAT/NAPT DEVICE

(75) Inventors: Kendra S. Harrington, Irvine, CA (US); Allen J. Huotari, Garden Grove, CA (US); Manrique Brenes, Corona Del Mar, CA (US)

(73) Assignee: Cisco Technology, Inc., San Jose, CA (US)

( * ) Notice: Subject to any disclaimer, the term of this patent is extended or adjusted under 35 U.S.C. 154(b) by 1182 days.

(21) Appl. No.: 11/151,823

(22) Filed: Jun. 13, 2005

(65) Prior Publication Data

US 2006/0291443 A1 Dec. 28, 2006

(51) Int. Cl.
*H04L 12/28* (2006.01)
(52) U.S. Cl.
USPC .............................. 370/389; 370/392; 370/401
(58) Field of Classification Search
USPC ......... 370/389, 392, 401, 402, 406, 410, 412, 370/419
See application file for complete search history.

(56) References Cited

U.S. PATENT DOCUMENTS

| | | | | |
|---|---|---|---|---|
| 6,618,353 | B2 * | 9/2003 | Merrill et al. | 370/225 |
| 6,892,245 | B1 | 5/2005 | Crump et al. | |
| 6,980,556 | B2 * | 12/2005 | Vimpari | 370/395.52 |
| 7,042,876 | B1 * | 5/2006 | Jayasenan et al. | 370/389 |
| 7,099,308 | B2 * | 8/2006 | Merrill et al. | 370/352 |
| 7,328,280 | B2 * | 2/2008 | Takeda et al. | 709/245 |
| 7,457,293 | B2 * | 11/2008 | Kokado | 370/392 |
| 7,483,393 | B2 * | 1/2009 | Wing | 370/254 |
| 7,706,401 | B2 * | 4/2010 | Bae et al. | 370/466 |
| 7,738,468 | B2 * | 6/2010 | Standridge et al. | 370/401 |
| 2003/0200318 | A1 * | 10/2003 | Chen et al. | 709/227 |
| 2005/0063350 | A1 * | 3/2005 | Choudhury et al. | 370/338 |
| 2005/0229238 | A1 * | 10/2005 | Ollis et al. | 726/4 |
| 2005/0240758 | A1 * | 10/2005 | Lord et al. | 713/153 |
| 2006/0075127 | A1 * | 4/2006 | Juncker et al. | 709/229 |
| 2006/0106918 | A1 * | 5/2006 | Evert et al. | 709/220 |
| 2006/0120293 | A1 * | 6/2006 | Wing | 370/241 |
| 2007/0036143 | A1 * | 2/2007 | Alt et al. | 370/352 |

* cited by examiner

*Primary Examiner* — Brian O'Connor
(74) *Attorney, Agent, or Firm* — Haynes and Boone, LLP

(57) ABSTRACT

In one embodiment, a network device is provided that includes a DHCP server; a NAT/NAPT facility; and a logic engine configured to detect a presence of an upstream NAT/NAPT service, the logic engine being further configured to disable the DHCP server and the NAT/NAPT facility in response to detecting the presence of the upstream NAT/NAPT service.

6 Claims, 1 Drawing Sheet

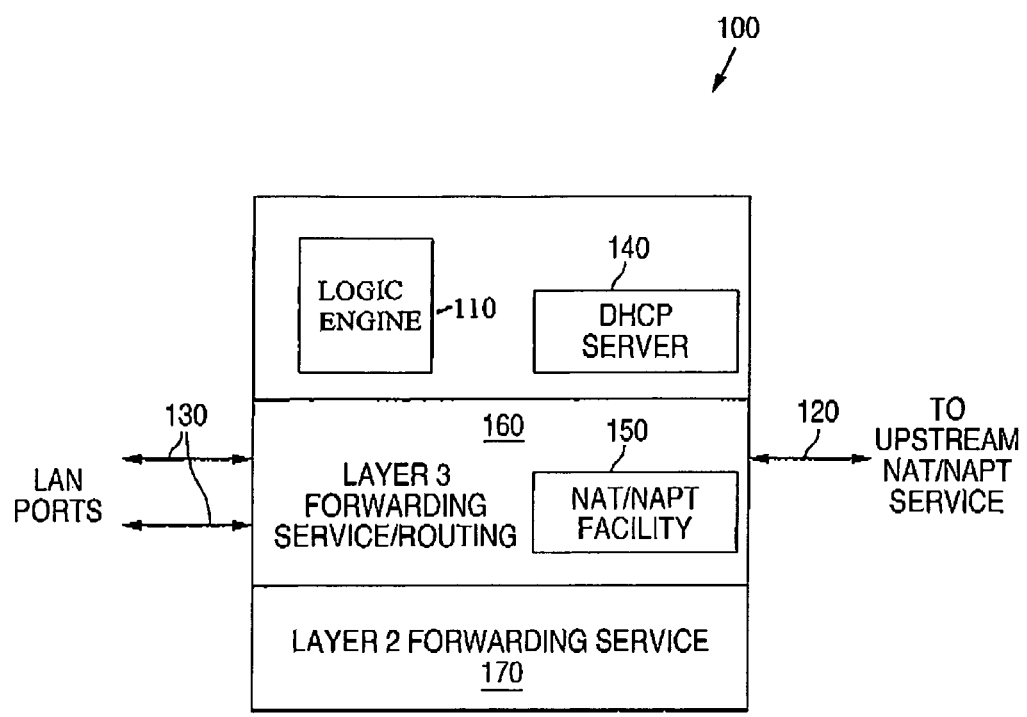

AUTOMATIC RECONFIGURATION OF LAYER 3 DEVICE TO LAYER 2 DEVICE UPON DETECTION OF UPSTREAM NAT/NAPT DEVICE

TECHNICAL FIELD

This invention relates generally to networks, and more particularly to network devices adapted to prevent double-NAT network issues.

BACKGROUND

Network users often desire to add an additional router to a network already configured with an existing router. For example, a user may wish to take advantage of new technology features such as VoIP. Because the existing router may have a desired feature such an embedded modem and since it is already configured for the network, the user may be reluctant to remove the existing router. A typical user lacks the technical expertise necessary to configure the new router into a mode of operation that is compatible with the existing router. For example, the existing router may be performing a network address translation (NAT) function. By employing NAT, the existing router allows multiple clients to share a public IP address. In particular, this sharing is often implemented using a form of NAT known as network address port translation (NAPT). The following discussion will simply refer to the various forms of address translations as NAT/NAPT. Conflicts arise when the newly-added router also employs NAT/NAPT, thereby creating what may be denoted as a double-NAT network. For example, to install a new router into an existing network, a user may couple a wide area network (WAN) port of the newly-added router to a local area network (LAN) port for the existing router. Peer-to-peer applications such as instant messaging or Internet gaming running behind the newly-added NAT/NAPT device may not operate normally due to the double translation of addresses that occur in a double-NAT network. In addition, dynamic host configuration protocol (DHCP) conflicts may arise. If the routers are on different subnets, roaming problems may occur. Moreover, it is difficult to configure the newly-added router from a computer coupled to the existing router because the newly-added router has an unknown IP address assigned to it from the DHCP server in the existing router. In addition, the upstream quality of service (QoS) for the newly-added router will be limited by the QoS capabilities of the (presumably older) existing router.

To prevent some of the problems associated with a double-NAT network in which the newly-added router couples through its WAN port to a LAN port of the existing router, a user may refrain from coupling devices to LAN ports on the newly-added router. In this fashion, the user may take advantages of new technology offered by the new router such as VoIP while keeping the already-configured-for-the-network existing router. Such a configuration eliminates the application and roaming problems caused by the presence of a double-NAT network. However, the QoS limitations and difficulties in configuring the newly-added router from a computer coupled to the existing router remain. Moreover, preventing attachment to the LAN ports on the newly-added router may violate a user's expectations. Thus, a user may also configure the newly-added router to disable its NAT and its DHCP server to allow the attachment of devices to the LAN ports. However, the difficulty of configuring the new router from a computer coupled to the existing router remains. Furthermore, the devices attached to the LAN ports of the new router may still be on a separate IP subnet as the new router is still acting as a layer 3 forwarding service (routing).

In an alternative implementation, a user may have the newly-adder router couple through its LAN port to a LAN port of the existing router. The newly-added router would then be configured by the user to have its DHCP server disabled such that the newly-added router acts as a switch for the existing router. However, this implementation would be inappropriate for routers such as VoIP-enabled routers—a VoIP-enabled router often has its VoIP port on the WAN side, not the LAN side such that by coupling the newly-added router through its LAN port, the VoIP capability is bypassed. Moreover, if the newly-added router has the same IP address as the existing router, configuration difficulties are unabated. Finally, the configuration difficulties may also be exacerbated if the existing router and newly-added routers are in different subnets.

Rather than install the newly-added router downstream from the existing router as discussed above, the new router may be installed in an upstream location such that it resides between the modem and the existing router. However, the double NAT problems would thus be transferred to the existing router. Moreover, users then have the difficulty of disconnecting existing network cables for reconnection to the newly-added router. In addition, it is difficult for users to transfer existing configuration settings such as WAN PPPoE usernames and passwords from the existing router to the new router. Also, such a configuration makes reconfiguring the existing router or accessing the GUI of either router problematic. Finally, this approach is inapplicable if the existing router is a gateway device having an embedded modem.

Accordingly, there is a need in the art for improved routers that avoid double NAT issues and other problems associated with their integration into existing networks.

BRIEF DESCRIPTION OF THE DRAWINGS

The FIGURE is a block diagram of a router in accordance with an embodiment of the invention.

Embodiments of the present invention and their advantages are best understood by referring to the detailed description that follows. It should be appreciated that like reference numerals are used to identify like elements illustrated in the FIGURES.

DETAILED DESCRIPTION

To avoid the double NAT issues and other problems associated with integration of a router into an existing network, router embodiments that auto disable NAT/NAPT service based upon a detection of upstream NAT/NAPT are disclosed. As will be described further herein, a number of techniques are known to enable a network device such as a router to detect the presence of upstream address translations induced by NAT/NAPT devices and facilities. Turning now to the drawing, an exemplary embodiment of a router 100 is illustrated that includes a logic engine 110 configured to practice such upstream NAT/NAPT detections. Logic engine 110 may be implemented with dedicated hardware, firmware, or with a general purpose microprocessor. Router 100 includes at least one WAN port 120 and a plurality of LAN ports 130. As known in the router arts, router 100 may include a DHCP server 140 that assigns local IP addresses to client devices coupled to router 100 through LAN ports 130. Router 100 may have a public IP address with respect to upstream devices coupled through WAN port 120. Router 100 may then translate the local IP addresses for its LAN-connected clients to the public IP address using a NAT/NAPT facility 150.

DHCP server 140 and NAT/NAPT facility 150 may function in a conventional fashion should router 100 be used to form a new local area network (LAN). However, if router 100 is instead integrated into an existing LAN having a router that already practices NAT/NAPT, the double NAT problems discussed earlier may arise. In addition, there are the problems associated with configuring router 100 using a computer coupled to the existing router. To avoid these problems, logic engine 110 is configured to detect the presence of upstream NAT/NAPT. Logic engine 110 is further configured to disable DHCP server 140 and NAT/NAPT service 150 should upstream NAT/NAPT be detected. In that regard, router 100 may a number of alternative embodiments. For example, in a first embodiment, router 100 would have its DHCP server 140 and NAT/NAPT service 150 enabled upon power-up. These services would then be disabled if upstream NAT/NAPT service is detected. Alternatively, in a second embodiment, router 100 would not have its DHCP server 140 and NAT/NAPT service enabled upon power-up. Instead, these services are only enabled if no upstream NAT/NAPT service is detected.

It will be appreciated that logic engine 110 may be configured to detect the presence of upstream NAT/NAPT in a number of ways. For example, logic engine 110 may be configured to function as a STUN (Simple Traversal of User Datagram Protocol (UDP) Through. Network Address Translators (NATs)) client. STUN requests operate by default on port 3478, for both TCP and UDP, and enable a STUN client to determine the presence and type of NAT/NAPT service it is sitting behind as well as its public IP address. As a STUN client, logic engine 110 would issue a shared secret request to a STUN server (not illustrated). In response, logic engine 110 would be furnished a temporary username and password with which it may use to authenticate subsequent binding requests and responses. For example, logic engine 110 may then issue a binding request to the STUN server using a UDP message, which may then respond with a binding response. To determine the presence of upstream NAT/NAPT, logic engine/STUN client 110 may compare the IP address and port in the binding response with the local IP address and port it bound to when the binding request was sent. If these addresses and ports do not match, the presence of upstream NAT/NAPT service is confirmed. Further comparison allows logic engine/STUN client 110 to determine the type of NAT/NAPT service it sits behind. However, logic engine 110 need merely determine the presence of upstream NAT/NAPT in one embodiment.

The actions taken subsequent to detection of upstream NAT/NAPT service depend upon whether DHCP server 140 and a layer 3 forwarding service 160 (i.e., routing) that includes NAT/NAPT facility 150 are operative upon power-up. Should these services be operative and logic engine/STUN client 110 determines it is behind one or more NAT/NAPT services, it may then disable DHCP server 140 and layer 3 forwarding service 160 (i.e. routing) In addition, STUN client 110 would enable layer 2 forwarding service 170 (i.e. bridging). Should router 100 include VoIP service, an integrated MTA (Media Terminal Adapter) within the router may use the IP address assigned to it by the pre-existing router. Advantageously, because layer 3 forwarding service 160 is disabled, all traffic to and from devices attached to LAN ports 130 may be forwarded transparently through router 100, despite the presence of upstream NAT/NAPT services. If logic engine/STUN client 110 does not detect upstream NAT/NAPT services, layer 3 forwarding service (routing) 160 functions as it would in any conventional router.

In an embodiment in which DHCP server 140 and layer 3 forwarding service 160 are not operative upon power-up and STUN client 110 does not detect the presence of upstream NAT/NAPT service, STUN client 110 may then enable operation of DHCP server 140 and layer 4 forwarding service 160. Thus, devices connected to LAN ports 130 need not be concerned whether layer 3 forwarding service is enabled or disabled, such functionality is transparent to these devices.

In those embodiments in which DHCP server 140 and layer 3 forwarding service are automatically enabled upon power-up, it will be appreciated that if the router self-configures after determining it is behind one or more NAT/NAPT services and as a result disables its own services during a power-on sequence, this same router will self-reconfigure automatically if placed in a new network scenario (e.g. where it determines it is no longer behind one or more NAT/NAPT services). Furthermore, additional timers may be applied to ensure the discover of upstream NAT/NAPT happens after a semi-random timing interval (e.g. exponential backoff) to prevent overflow and/or saturation of upstream services.

Other facilities may be used to detect the presence of upstream NAT/NAPT service. For example, logic engine 110 may be configured to operate as a UPnP (Universal Plug and Play) client. In such an embodiment, the existing network within which router 100 is being installed should include a UPnP IGD (Internet Gateway Device). As discussed with respect to the use of a STUN client, the detection of upstream NAT/NAPT service using a UPnP client may occur in a number of fashions. For example, router 100 may be configured to automatically enable operation of its DHCP server 140 and layer 3 forwarding service 160 upon power-up. If logic engine 110 detects the presence of a pre-existing UPnP IGD, it would disable its DHCP server 140 and NAT/NAPT service 150 such that it functions as a layer 2 bridging device. As discussed for the STUN embodiment, because DHCP server 140 is disabled, all DHCP traffic to and from devices attached to LAN ports 130 may be forwarded transparently through router 100. Conversely, if router 100 is not being installed in a pre-existing network such that it does not detect the presence of upstream NAT/NAPT service, it would configure itself as the IGD, thereby allowing its DHCP server and NAT/NAPT service to be operative. Note, however, that a UPnP embodiment would fail if a UPnP-enabled router 100 were installed in a pre-existing network that did not include a UPnP IGD.

Although the invention has been described with respect to particular embodiments, this description is only an example of the invention's application and should not be taken as a limitation. In that regard, other techniques besides incorporating a STUN client or a UPnP client into the router may be implemented to detect the presence of upstream NAT/NAPT service. For example, a HomePlug or a HomePNA client also has the ability to detect upstream NAT/NAPT service. Consequently, the scope of the invention is set forth in the following claims.

We claim:

1. A method, comprising:

in response to a powering up of a router including a STUN client, detecting whether there is NAT/NAPT service upstream to the router by comparing STUN messages from the STUN client and from a STUN server;

if upstream NAT/NAPT service is detected, disabling a DHCP server, a NAT/NAPT facility, and a layer 3 forwarding service within the router, and enabling a layer 2 forwarding service within the router in a manner that causes the router to act as a layer 2 bridge between layer 2 network nodes coupled to a WAN port on the router and layer 2 network nodes coupled to a LAN port on the router.

2. The method of claim 1, wherein the comparison of the STUN messages comprises:

issuing a binding request from the STUN client to the STUN server;

in response to receiving the binding request at the STUN server, receiving a binding response at the STUN client;

comparing an IP address and port for the binding request and the binding response; and if the comparison determines that the IP address and port for the binding request and binding response differ, indicating the presence of the upstream NAT/NAPT service.

3. The method of claim 1, further comprising:

if the upstream NAT/NAPT service is not detected, enabling the DHCP server to issue a plurality of temporary IP addresses to a corresponding plurality of LAN clients and enabling the NAT/NAPT facility to perform IP address translations for the plurality of LAN clients.

4. A network device, comprising:

a DHCP server;

a NAT/NAPT facility;

a STUN client for detecting a presence of an upstream NAT/NAPT service by comparing an IP address and port number for a binding request and a corresponding binding response, and a logic engine configured to, in response to the STUN client detecting the presence of the upstream NAT/NAPT service, disable the DHCP server, the NAT/NAPT facility, and a layer 3 forwarding service in the network device and to enable a layer 2 forwarding service in the network device in a manner that causes the device to act as a layer 2 bridge between layer 2 network nodes coupled to a WAN port on the router and layer 2 network nodes coupled to a LAN port on the router.

5. The network device of claim 4, wherein the STUN client is configured to detect the presence of the upstream NAT/NAPT service by comparing an IP address and port number for a binding request and a corresponding binding response.

6. The network device of claim 4, wherein the network device comprises a router having a plurality of LAN ports, and wherein the DHCP server is configured to assign temporary IP addresses to client devices coupled through the plurality of LAN ports if the STUN client does not detect the presence of the upstream NAT/NAPT service.

* * * * *